(12) United States Patent
Govind et al.

(10) Patent No.: US 9,816,487 B2
(45) Date of Patent: Nov. 14, 2017

(54) SYSTEM AND METHOD FOR INTEGRATING A HORIZONTAL AXIS WIND TURBINE AND A VERTICAL AXIS WIND TURBINE

(71) Applicants: Bala Govind, Bangalore (IN); Vignesh Gurumurthy, Vellore (IN)

(72) Inventors: Bala Govind, Bangalore (IN); Vignesh Gurumurthy, Vellore (IN)

(73) Assignee: Bala Govind, Bangalore (IN)

( * ) Notice: Subject to any disclaimer, the term of this patent is extended or adjusted under 35 U.S.C. 154(b) by 111 days.

(21) Appl. No.: 14/992,022

(22) Filed: Jan. 11, 2016

(65) Prior Publication Data

US 2016/0201652 A1    Jul. 14, 2016

(30) Foreign Application Priority Data

Sep. 23, 2015  (IN) ............................ 5090/CHE/2015

(51) Int. Cl.

| | |
|---|---|
| *F03D 7/02* | (2006.01) |
| *F03D 7/06* | (2006.01) |
| *F03D 3/00* | (2006.01) |
| *F03D 3/06* | (2006.01) |
| *F03D 1/06* | (2006.01) |
| *F03D 80/80* | (2016.01) |
| *F03D 15/00* | (2016.01) |

(52) U.S. Cl.
CPC .............. *F03D 7/06* (2013.01); *F03D 1/0666* (2013.01); *F03D 3/005* (2013.01); *F03D 3/062* (2013.01); *F03D 15/00* (2016.05); *F03D 80/88* (2016.05); *F05B 2260/4031* (2013.01); *Y02E 10/721* (2013.01); *Y02E 10/74* (2013.01)

(58) Field of Classification Search
CPC . F03D 7/06; F03D 80/88; F03D 15/00; F03D 1/0666; F03D 3/062; F03D 3/005; F03D 9/25; Y02E 10/721; Y02E 10/74; Y02E 10/725; F05B 2260/4031
See application file for complete search history.

(56) References Cited

U.S. PATENT DOCUMENTS

| | | | | |
|---|---|---|---|---|
| 4,047,833 | A | * | 9/1977 | Decker ................. F03D 3/0409 290/55 |
| 4,585,950 | A | * | 4/1986 | Lund ........................ F03D 9/25 290/44 |

(Continued)

*Primary Examiner* — Michael Zarroli (57) ABSTRACT

An integrated axis wind turbine system is provided. The system includes a support tower on which is mounted a turbine whose nacelle comprises of drive train consisting of a horizontally aligned main shaft and an associated a set of horizontal shafts at different elevations which transfer rotary motion from a set of blades and which culminates in electricity generation. When the set of blades rotate at an angular speed exceeding a predefined threshold, excess torque is transmitted by a right angle transmission, via a Continuously Variable Transmission, to a vertically aligned central shaft which is coupled to a second turbine's set of blades whose rotary motion also culminates in electricity generation. The angle of attack of wind on the secondary set of blades is adjusted by a blade positioning system. By the integrated operation of the two turbines, the operational capacity of the combined system is increased.

7 Claims, 13 Drawing Sheets

(56) References Cited

U.S. PATENT DOCUMENTS

| | | | | |
|---|---|---|---|---|
| 6,304,002 | B1* | 10/2001 | Dehlsen | F16H 1/22 |
| | | | | 290/1 C |
| 7,094,017 | B2* | 8/2006 | Kurita | F03B 17/067 |
| | | | | 415/4.2 |
| 8,203,229 | B2* | 6/2012 | Stone | F03D 7/0248 |
| | | | | 290/4 R |
| 8,796,873 | B2* | 8/2014 | Zhu | H02P 9/007 |
| | | | | 290/1 C |
| 8,851,839 | B2* | 10/2014 | Eckart | F03D 7/0272 |
| | | | | 416/9 |
| 8,912,681 | B1* | 12/2014 | Filkins | F03D 15/00 |
| | | | | 290/44 |
| 9,181,928 | B2* | 11/2015 | Tjensvoll | F03D 11/028 |
| 9,410,534 | B2* | 8/2016 | Grieve | F03D 15/00 |
| 2005/0280264 | A1* | 12/2005 | Nagy | F03D 9/25 |
| | | | | 290/55 |
| 2017/0051720 | A1* | 2/2017 | Grigg | F03D 3/068 |

\* cited by examiner

Fig. 6 Shaft rotation reversal arrangement

SYSTEM AND METHOD FOR INTEGRATING A HORIZONTAL AXIS WIND TURBINE AND A VERTICAL AXIS WIND TURBINE

BACKGROUND

Technical Field

The present disclosure relates to the field of wind turbines. More particularly, but not exclusively, the present disclosure relates to the integration of two categories of wind turbines, Horizontal Axis Wind Turbines (HAWTs) and Vertical Axis Wind Turbines (VAWTs).

Discussion of Related Art

The invention is a refinement of the current method of harvesting wind energy using Horizontal Axis Wind Turbines (HAWTs) by integrating them with Vertical Axis Wind. Turbines (VAWTs) to facilitate a high density power resource. This heightens the wind speed limit that the HAWTs can withstand to produce electricity.

Horizontal axis wind turbines (HAWTs) are the primary source of grid connected wind power. To optimize the power drawn at varying wind speed, several control schemes have been devised. They include the implementation of combinations of rotor speed control algorithms for synchronous power generation using methods such as Maximum Power Point Tracking (MPPT) and Hill Climb Search (TICS). Primarily, they incorporate pitch mechanisms of the aerofoils to vary the angle of attack of wind. This controls the instantaneous Tip Speed Ratio (T.S.R) of the HAWT. Conventionally, at high wind speeds nearing the rated speed of the wind turbine, the HAWT's rpm may be stall controlled or pitch controlled to limit power generation, causing the wastage of a portion of potential wind power at a site.

The aerodynamics of Vertical Axis Wind Turbines (VAWTs) is more complicated. The scheme of arranging these turbines in arrays so that they may mutually aid each other in rotation is an area of topical research. Unlike their horizontal axis counterparts, VAWTs cannot access the stream of fast flowing wind as they are located at a lower elevation from the ground. Further, they have a smaller swept area than HAWTs and also suffer from turbulence at ground level. To save costs, intermediate gearboxes are avoided and instead low solidity ratio models which facilitate low torque, high rpm central shaft rotation to optimize the use of alternators, are used. These designs, however, do not increase the power capacity of VAWTs and they are generally fabricated to serve a purpose of 8-10 kW onsite power generation. They do little to challenge the crescendo of power consumption at the grid level. Few efforts have been made to fabricate VAWTs of megawatt scale.

Heavy and growing dependence on imported fossil fuels creates severe monetary problems apart from adding to energy insecurity. Many of their older low-capacity (<500 kW) wind turbines installed more than 10 to 12 years ago occupy some of the best wind sites. These turbines need to be replaced with more efficient, larger capacity machines to repower the wind farms. Maintenance costs tend to be higher for aging wind turbine generators. Breakdown of critical components severely affects machine availability and increases operational cost of these small capacity turbines.

Under normal operating conditions, a conventional HAWT rotor facilitates a prime mover rotating at an angular speed suitable for synchronous generation. When the main shaft's rpm dips below the reference rpm, auxiliary power is supplied to make it synchronous, or the pitch of its blades is varied to alter the Tip Speed Ratio (TSR), normally around 5 to 6 for a 3-bladed turbine. Under high wind speed conditions which are unsuitable for operation, the pitch is varied to change the angle of attack or in extreme cases, brakes may be applied to cease electricity generation until favorable conditions ensue. The energy supplied by the wind every second is proportional to swept area of the rotor and the cube of the prevailing wind speed. Therefore, by limiting the force of the wind by reducing the Tip Speed Ratio, the full potential of the wind is unutilized due to electrical limitations. Instead, if there were a mechanism by which the energy from this higher energy source could be siphoned to a lower energy source, as a sink, without wasting it on a dump load (often done in non-grid connected/local electrical storage systems), then this setup may be used like a regenerative system.

The invention introduces the concept of using a modified VAWT to optimize the power output of the HAWT with the objective of repowering the HAWT in a unique way. Electric power is simultaneously generated by the VAWT at a lower height location on the same support tower. Transfer of the excess torque exerted on the HAWT's main shaft, at high wind speeds, to the VAWT's central shaft is made possible by using a Continuously Variable Transmission (CVT) Contrary to a manual or a conventional automatic transmission, the operation of a CVT involves no torque interruption during change in angular speed. This is because has no explicit gears. It is capable of smooth acceleration with no jerking motion during the integration of the HAWT and VAWT. This progressive technology provides the option for operators to improve the profitability on their site.

SUMMARY

An embodiment provides a wind turbine system. The wind turbine comprises an elevated nacelle. The elevated nacelle comprises a main shaft, horizontally aligned to the elevated nacelle, coupled with a set of blades, wherein the set of blades rotate about a longitudinal axis of the elevated nacelle. The elevated nacelle comprises a set of horizontal shafts associated with the main shaft at different elevations inside the elevated nacelle. The elevated nacelle comprises a mechanism to rotate the set of horizontal shafts along with the main shaft when the set of blades are subject to force of wind.

An embodiment provides a method for operating a wind turbine. The wind turbine comprises horizontal axis wind turbine and vertical axis wind turbine. The method comprises transferring a torque generated by movement of a set of blades of horizontal axis wind turbine (HAWT) to generate energy. The method further comprises transferring a torque generated by movement of straight blades of vertical axis wind turbine (VAWT) to generate energy. The method further comprises controlling the wind turbine to transfer the torque generated by HAWT to VAWT in case the torque generated by HAWT is above a predetermined threshold.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENT

To obtain a high performance, this integrated system must fulfill three criteria:

1) A mechanically robust motion transfer mechanism
2) Aero dynamical stability, i.e. the effect of the rotation of one turbine on the flow field should not affect the other turbine.
3) An intelligent control algorithm which ensures a smooth gradient in the relevant power curves.

Figure 12:
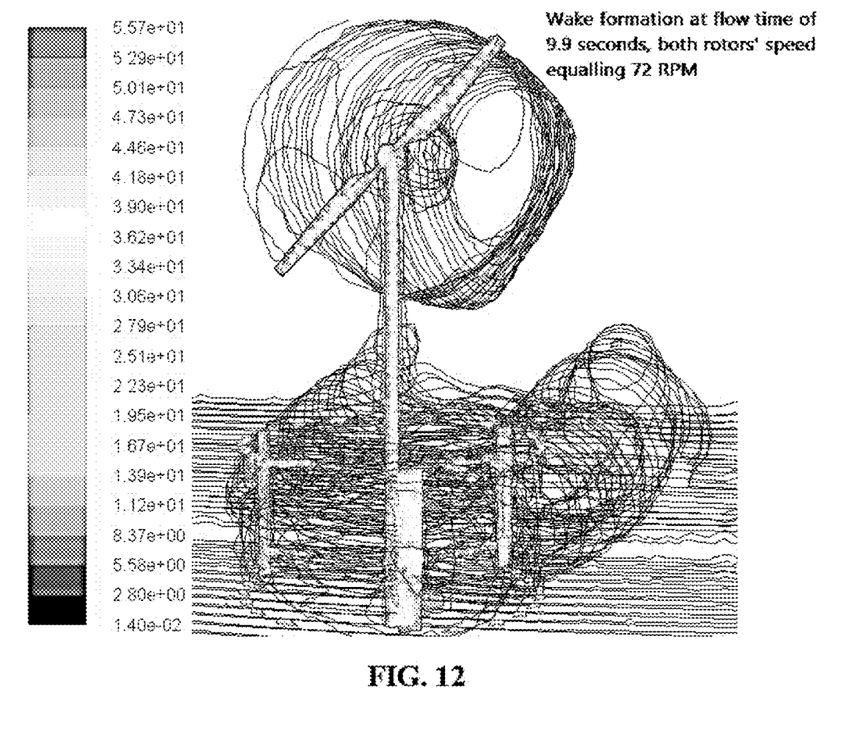
FIG. 12 shows the velocity contours formed by the flow of wind through the integrated axis wind turbine, in accordance with an embodiment. It supports concept that the operation of one turbine does not have appreciable aerodynamic effect on the operation of the other turbine.

A Computational Fluid Dynamics methodology shows that the effect of turbulence on the flow field due to one turbine does not affect the operation of the other turbine. FIG. 12 shows the velocity contours due to flow of wind through the combined system of horizontal and vertical axis wind turbines at a flow time of 9.9 seconds. The angular speed of both turbines is 72 rpm and wind speed is 8 m/s. It can be conceived that there is no appreciable effect of turbulence caused by either turbine on the operation of the other. Also, there is no appreciable interaction between the wake regions formed by the two turbines.

Primary Drive Train to Facilitate Motion Transfer

Figure 1:
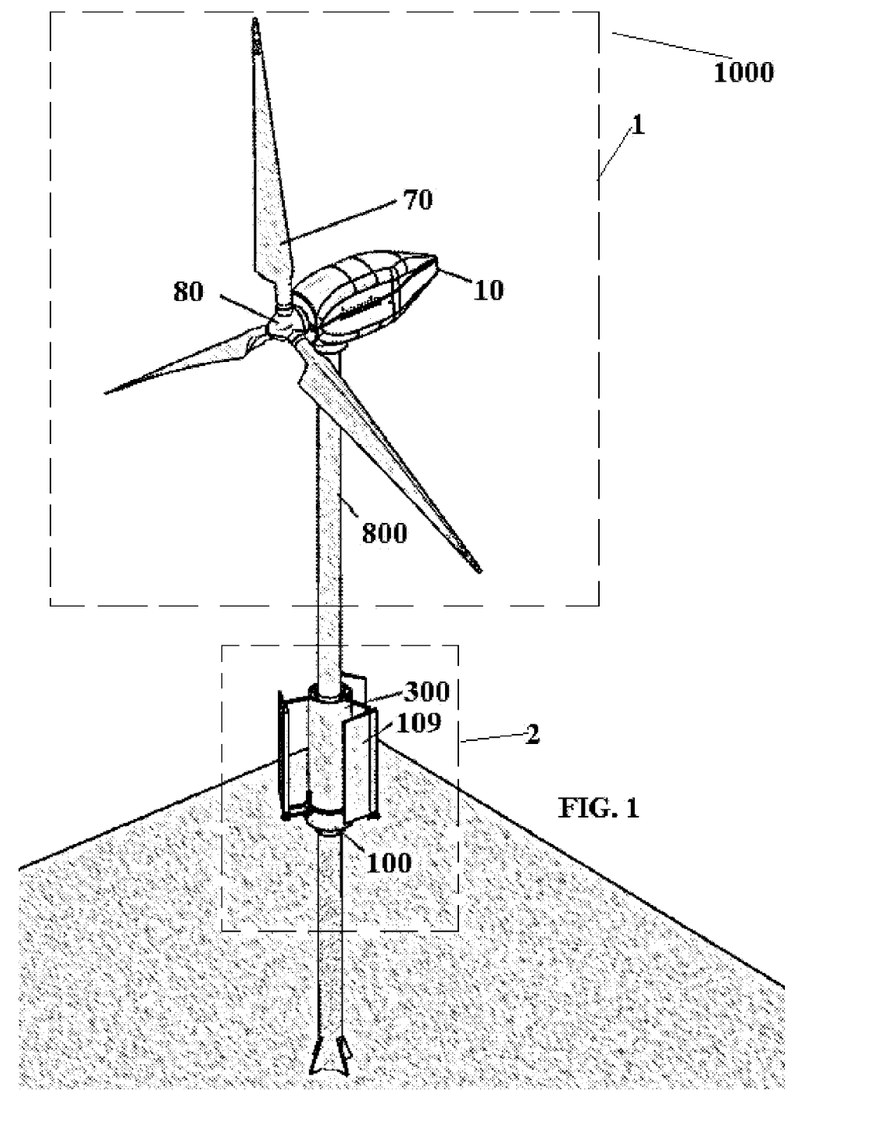
FIG. 1 is a perspective view of a wind turbine 1000 comprising a Horizontal Axis Wind Turbine 1 and a Vertical Axis Wind Turbine 2 mounted on the support tower 800, in accordance with an embodiment.
Figure 2:
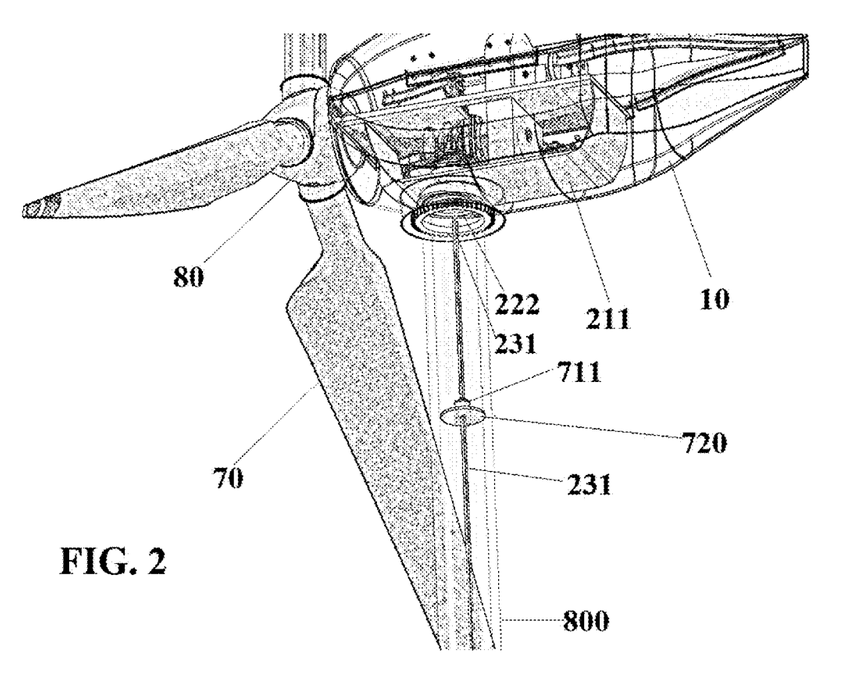
FIG. 2 is a perspective view showing the relative placement of the VAWT central shaft 231, and components of a drivetrain in the HAWT's nacelle 10, in accordance with an embodiment.
Figure 3:
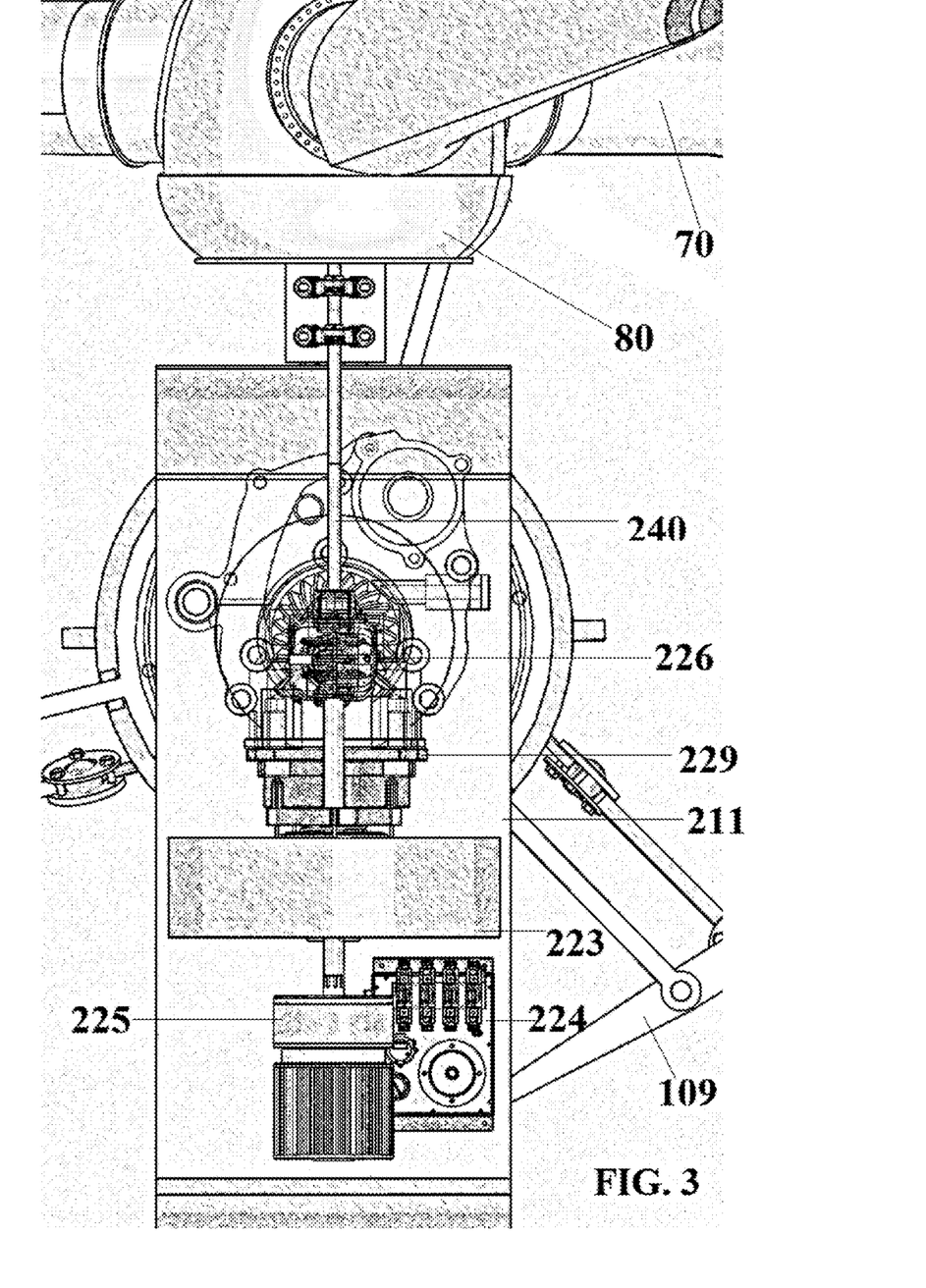
FIG. 3 is a top view of the wind turbine 1000 of FIG. 1, in accordance with an embodiment.
Figure 4:
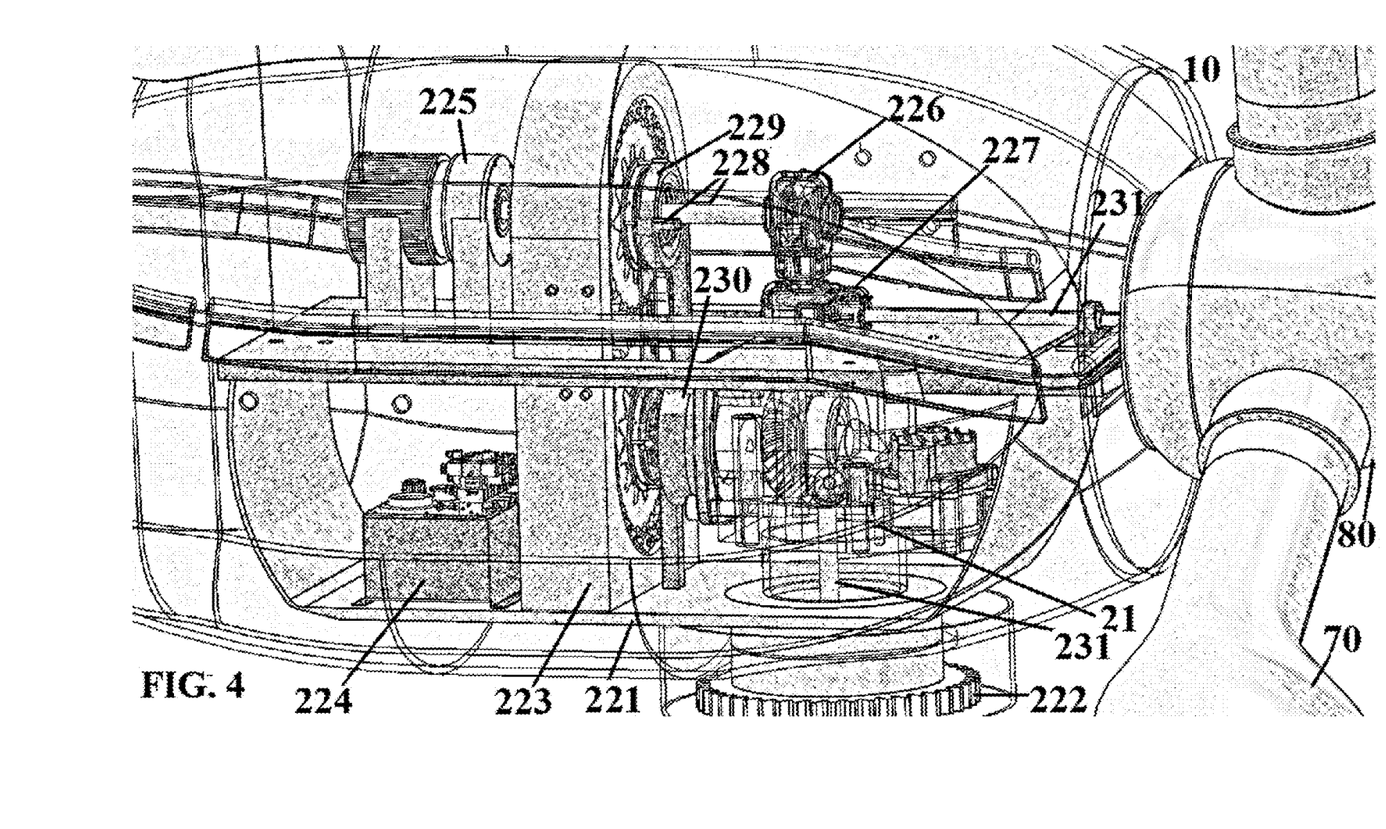
FIG. 4 is a perspective view of the drivetrain inside the HAWT's nacelle 10, in accordance with an embodiment.

From FIG. 1, it can be conceived that the 'integrated axis wind turbine' system primarily consists of a modified large-scale VAWT 2 mounted on the tower of a HAWT 1. A thin walled shell forms the rotor of the VAWT 2 which rotates about the central axis of the HAWT's tower. Radial arms are attached by suitable means to the shell. This construction ensures that a larger amount of material is distributed at a greater radius from the central axis of the tower. This consequently provides a greater moment of inertia, and thereby greater torque which yields more power.

The numeral 800 is designated to a stationary support tower/cylindrical pillar which is hollow and of suitable construction. Circumferential to this tower 800 is mounted the cylindrical shell 300 constituting the rotor of the vertical axis wind turbine. Housing 310 supports hydraulic cylinders which provide actuation for its pitch mechanism. Straight blades of the VAWT 2 are mounted using radial arms and are connected via connecting rods to the slider 100.

On the upper end of the tower is mounted the nacelle 10 of the horizontal axis turbine which yaws about the central axis by suitable yaw mechanism. The rotor of the HAWT 1 consists of blades 70 and hub 80 and its main shaft and drive train engaged with its generator.

FIGS. 3, 4 and 5A-5C show the essential motion transfer within the modified nacelle 10 of the HAWT 1. The two helically profiled bevel gears constitute a right angle transmission which transfers excess torque from horizontal shaft which receives excess torque from the eccentrically placed parallel main shaft of the HAWT 1, to the perpendicularly aligned vertical central shaft 231 of the VAWT rotor when the two are engaged with the CVT. This transfer occurs only when the integration of the two turbines is in effect. Housings 229 and 230 support the actuation mechanism and guideways for engagement of the horizontal shafts with the CVT.

The relative position of the two bevel gears of the main right angle transmission ensures that rotational motion may be transferred from the horizontal rotor to the VAWT's central shaft 231 when the nacelle 10 simultaneously yaws about the tower. The bevel gear which is integral to the nacelle 10 rolls along the circumference of the other bevel gear which is integral to the central shaft 231. The latter's axis of rotation corresponds to the axis of rotation of the nacelle 10 and also to the longitudinal axis of the support tower of the HAWT 1.

All components of the nacelle 10 have the base of their support structure horizontally inclined and are entire weight of this setup is borne by base plate 221. Vertical angular contact bearing units 711 mounted on support plates 720 are suitably arranged at periodic vertical distances along the length of tower 800 to maintain steady rotation of VAWT central shaft 400.

Figure 10:
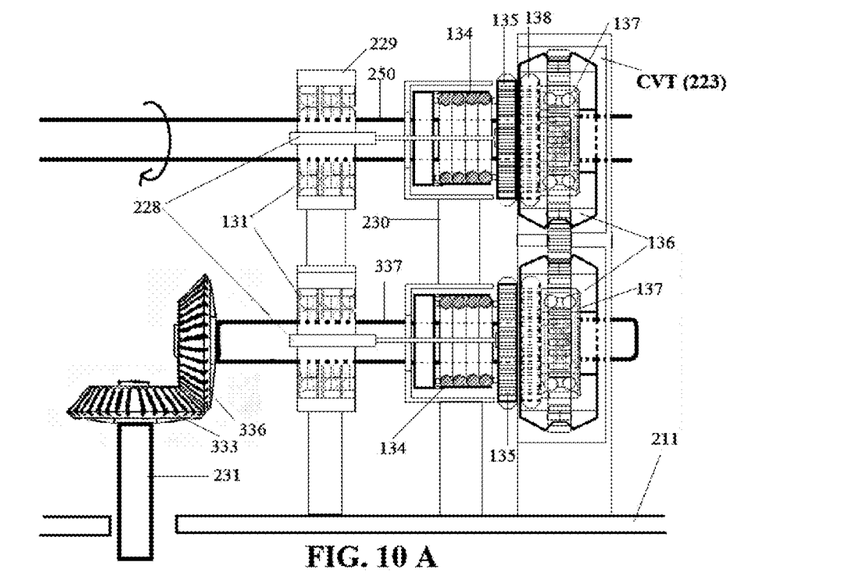
FIG. 10A is a schematic diagram of the engagement of horizontally aligned shafts with the CVT and motion transfer to main right angle transmission, in accordance with an embodiment.
FIG. 10B is another schematic diagram of the engagement of horizontally aligned shafts with the CVT and motion transfer to main right angle transmission, in accordance with an embodiment.

The Torque Splitting Continuously Variable Transmission and Main Right Angle Transmission FIGS. 3, 4 and 5A-5C shows the mechanism for the excess torque transfer from the secondary shaft 250 of the horizontal axis wind turbine 1 to the horizontal extension of the shaft 231 by metal belt of the CVT/constant speed drive 223. The radii of its two 'sprockets' varies according to the varying speed ratio. This CVT is used to ensure smooth coupling of the rotors without mechanical shock. FIGS. 10A and 10B shows the mechanism of engagement of the shafts with CVT which is similar to the mechanism used in a dog clutch.

Hydraulic linear actuators 228 engage the toothed wheels 135 to the slotted cavities 138 in the sprockets 136 of the CVT. The telescopic shafts 134 can be extended concentrically parallel to the shafts 250 and 337 and along their length. Both telescopic shafts are integral to the horizontal shafts which may be engaged with the CVT, via a spring-type mechanism, to the slotted wheels which each engage with the sprockets of the CVT. They are protected from wobbling effects by support fixture 230. Their retractable action is facilitated by the spring mechanism. Their length is shortened when hydraulic fluid is withdrawn in hydraulic pistons of actuators 228. Linear actuators 228 are held in support fixture 229.

Bearings 131 and 137 support the shaft held in the support fixture and CVT.

FIG. 10A shows the position of the retracted toothed wheels and stationary main right angle transmission when the CVT is not in operation. Only the rotation of shaft 250 is maintained. FIG. 10B shows the action of extended telescopic shafts which transfers excess torque from shaft 250 to shaft 337 when engaged with sprockets of the CVT. The radii of the CVT can be varied by changing the width of the sprockets. This changes the sprockets' angular speed. The CVT ratio is given by $$r = \frac{\omega_V}{\omega_H},$$

where $\omega_V$ is the angular speed of the VAWT central shaft and $\omega_H$ is the angular speed of the HAWT shaft extension 250.

The rotary motion is transferred via the gears 333 and 336 of main right angle transmission to shaft 231 which is further coupled to central shaft 400 during integration of the HAWT 1 and the VAWT 2. All support fixtures are mounted rigidly on base plate 211 of the HAWT nacelle 10.

Figure 5:
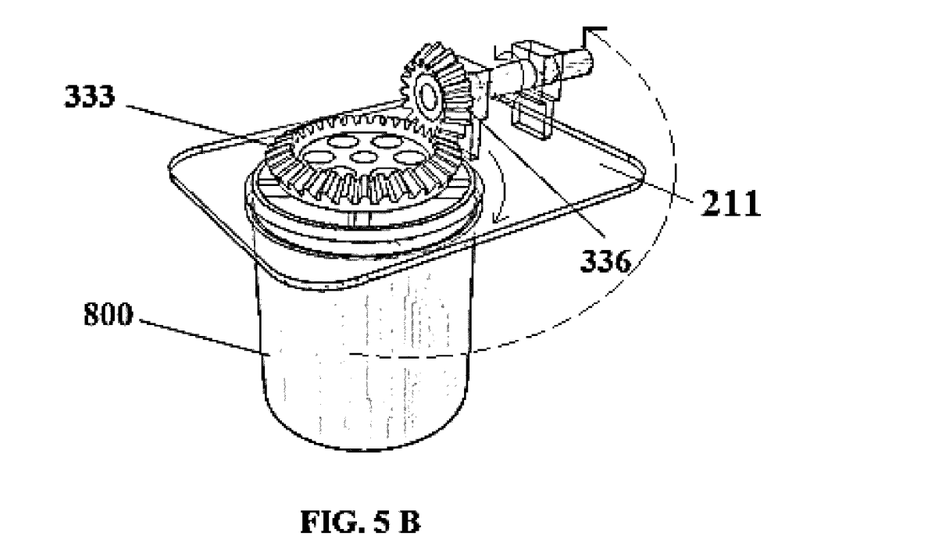
FIG. 5A is a perspective view of a mechanism for excess torque transfer from a secondary shaft 250 of the HAWT 1 to a horizontal extension of the shaft 231, in accordance with an embodiment.
FIG. 5B is an exemplary illustration of the torque transfer between gear 336 of HAWT 1 and gear 333 of VAWT 2, and simultaneous yawing of base plate 211 of the nacelle 10, in accordance with an embodiment.
FIG. 5C is another exemplary illustration of the torque transfer between gear 336 of HAWT 1 and gear 333 of VAWT 2, and simultaneous yawing of base plate 211 of the nacelle 10, in accordance with an embodiment.
Figure 5A:
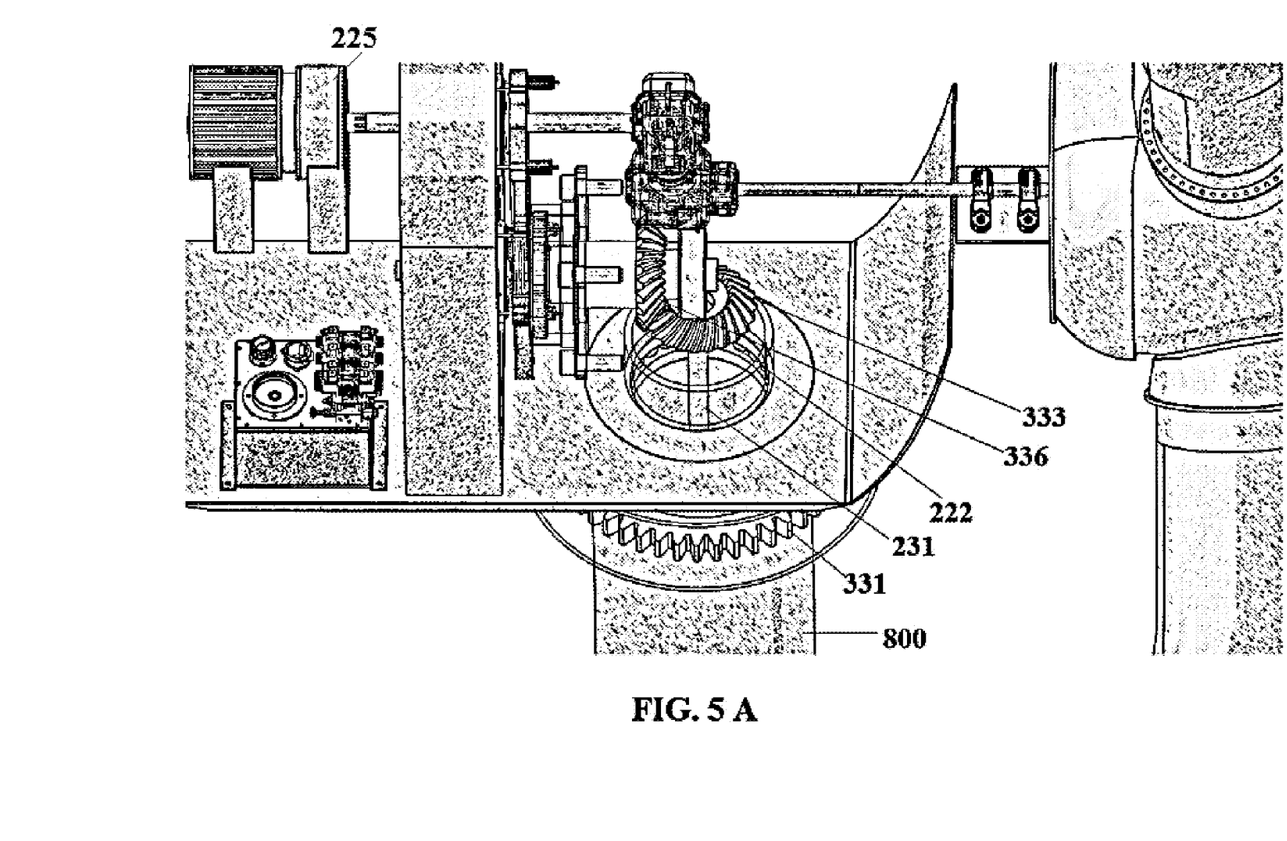

Referring in particular to FIG. 5A-5C, the horizontally aligned bevel gear 336 rolls over the vertically aligned bevel gear 333 which is the end portion of shaft 231 which is coupled when required to central shaft 231. Hence, excess rotational motion may be transferred from the horizontal rotor to the vertical rotor in the form of split torque while the nacelle 10 simultaneously yaws about the tower by means of the yaw gear 331 and yaw beating 222. The apexes of the teeth of the two gears in contact are coincident and have a rolling contact. Yawing operation is done in the direction (clockwise or anticlockwise) that ensures that the two gears mutually assist in rotation. The insert in FIG. 5 shows the smaller gear, representative of gear 336, rolling over a larger gear representative of gear 333 at two different positions of the nacelle 10 which yaws about the tower by an angle of 60 degrees. In the preferred construction, it is desired that both bevel gears be of equal size to transmit uniform angular speed without speed reduction.

The yaw gear used is of the ring type and is placed circumferentially around the central shaft 400.

Motion Transfer Mechanism from the Outer Shell of the Vertical Rotor to the Vertical Central Shaft FIGS. 2, 7, 8A and 8B show the motion transfer arrangement within the VAWT and the tower.

Figure 8:
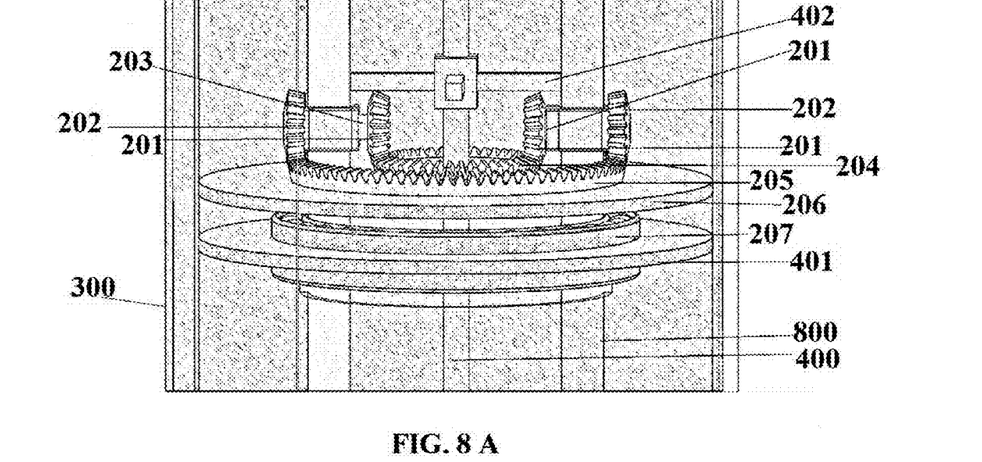
FIG. 8A is a sectional view of the tower 800 of FIG. 1 indicating the gear arrangements for motion transfer from VAWT shell to the central shaft 400, in accordance with an embodiment.
FIG. 8B is another sectional view of the tower 800 of FIG. 1 indicating the gear arrangements for motion transfer from VAWT shell to the central shaft 400, in accordance with an embodiment.
Figure 9:
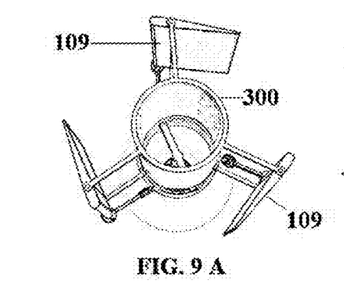
FIG. 9A is a perspective view of straight blades 109, in its initial position, of the VAWT 2, in accordance with an embodiment.
FIG. 9B is another perspective view of FIG. 9A, in accordance with an embodiment.
FIG. 9C is a perspective view of straight blades 109, in its expanded position, of the VAWT 2, in accordance with an embodiment.
FIG. 9D is another perspective view of FIG. 9C, in accordance with an embodiment.
FIG. 9E illustrates hydraulic pitch actuation mechanism of the straight blades 109 of the VAWT 2 of FIG. 9A, in accordance with an embodiment.

The numeral 200 is used to designate the gear arrangement for rotary motion transfer from shell 300 to central shaft 400. FIG. 8A shows a configuration which consists of a bevel gear 205 mounted on plate 206 provides the required rotational motion transfer between the shell 300 to central shaft 400 via pinions 201 and 202 which rotate at same speed. Central gear 204 has its support keyed and fixed to shaft 400 and is engaged with the pinions. Gear 205 does not have contact with the tower and is integral to the shell 300.

The bevel gears 201 rotate faster that the input gear 205. It may be noted at that the apexes of all the bevel gears are coincident. Ring bearing 207 has inner race fixed to support tower 800 and supports the plate 401 which is attached externally to shell 300.

FIG. 8B shows an alternate configuration using straight faced gears. Assembling straight faced gear drives 751, 750, 753 and 754 is easy in comparison with bevel gear drives. It is possible to equalize the input and output velocities by selecting appropriate tooth numbers of gears and pinions to fulfill the equation.

$$\frac{Z_2}{Z_1} \times \frac{Z_4}{Z_3} = 1$$

Where Z1, and Z2 are tooth numbers of gear and pinion for the outer drive respectively and the Z4 and Z3 are tooth numbers of gear and pinion for the inner drive respectively. The assembly is supported by ring bearing 207.

The central shaft 400 of the vertical axis rotor is coupled, when integrated, to the segmented shaft 231 by a fluid coupling (not shown). Also the individual segments are supported by support plates 720 and vertical shaft bearings 711.

Shaft Rotation Reversal Mechanism

Figure 6:
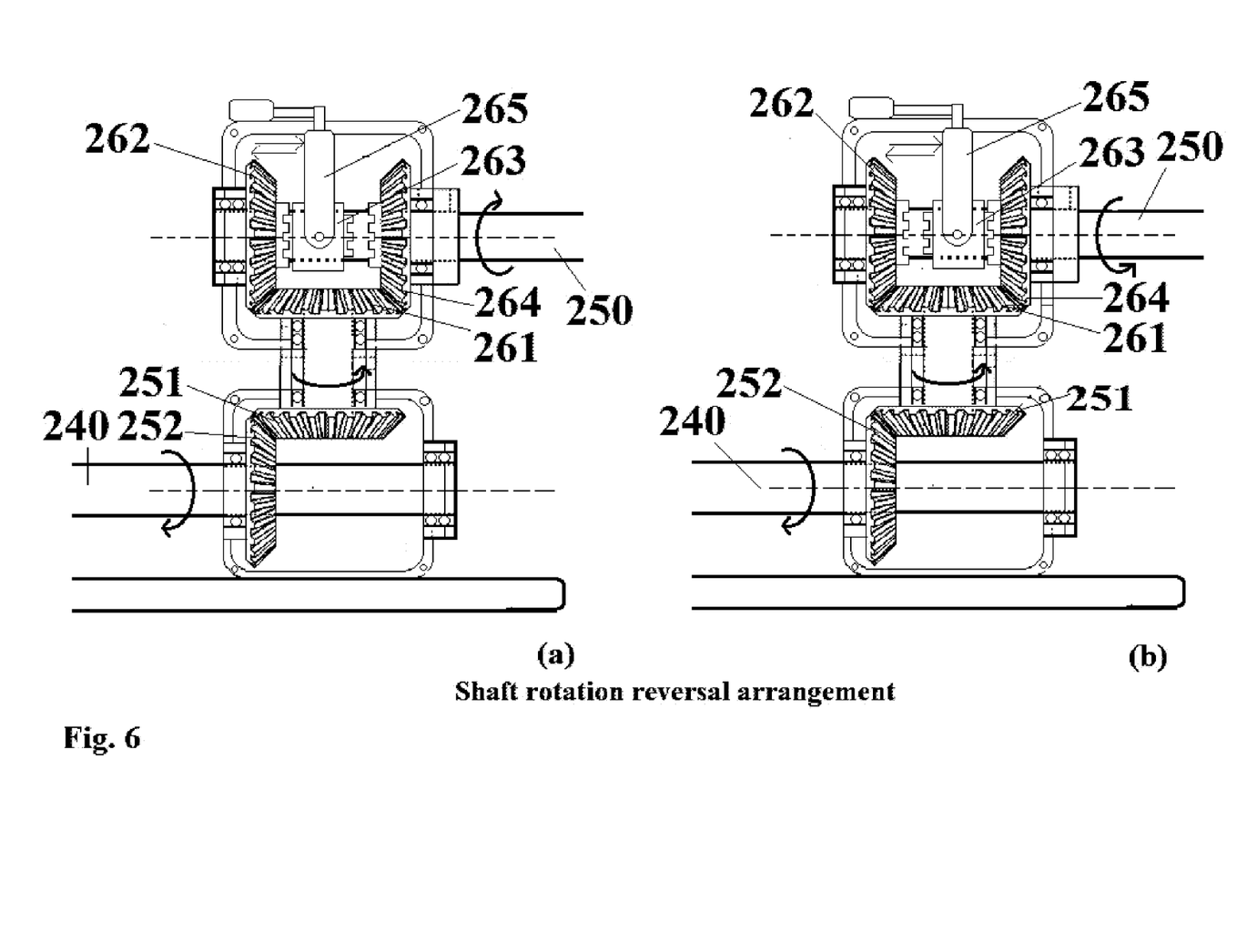
FIG. 6 shows the shaft rotation reversal mechanism 226 as a part of the drive train of FIG. 4, in accordance with an embodiment.
Figure 7:
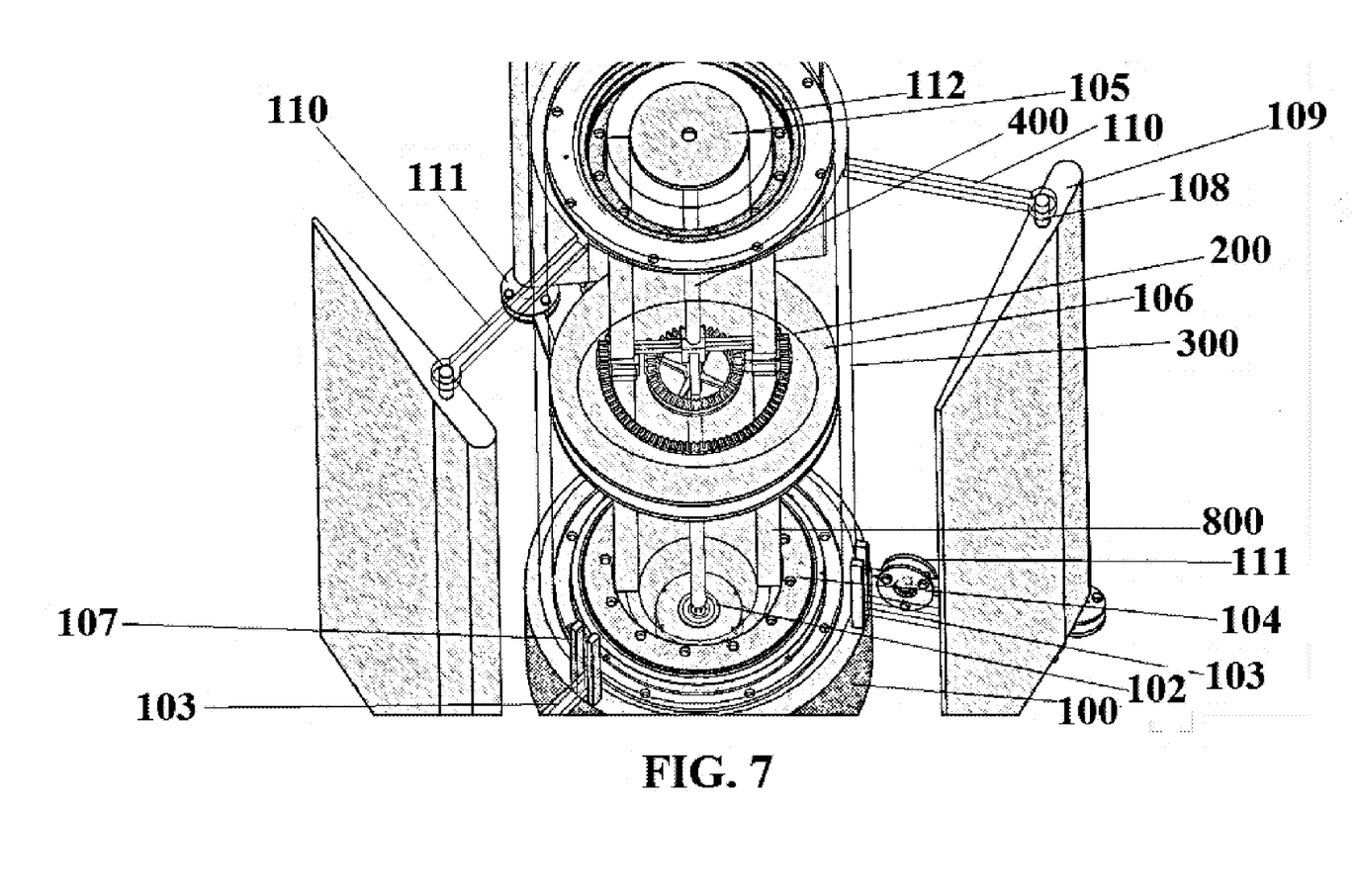
FIG. 7 is a perspective view of the motion transfer mechanism of the VAWT 2 inside the support tower 800 of FIG. 1, in accordance with an embodiment.

Referring to FIG. 6, a shaft rotation reversal mechanism 226 is provided to ensure that the HAWT secondary shaft 250 and VAWT central shaft 400 are rotating in the same sense (anticlockwise or clockwise). This is necessary so they do not oppose each other when engaged with the CVT.

The bevel 261 is the driver. The secondary shaft 250 of the bevel gears oscillates between either clockwise and anti-clockwise directions of rotation depending on which of the two gears 262 and 264 the clutch 263 is engaged with and the angular speed depends on the gear ratio and is specific to the application.

The two gears 262 and 264 rotate freely on the output shaft 250. The clutch consists of a toothed collar 263 and its support 265 and has a splined profile to engage with the output shaft. Its position is changed by a pair of linear actuators (not shown). The bevel gears 261, 251 and 252 form a right angle transmission which transfers motion from the eccentrically separated and parallel aligned HAWT main shaft 240 and shaft 250.

Pitch Mechanism of the Vertical Axis Wind Turbine

In FIGS. 9A-9E, simplistic representation of the pitch mechanism is shown. Two positions of the blades are shown, one in which the blades are in their initial position and the other in which the blades are in expanded position. The angular position of blades depends on the height of the cylindrical slider whose elevation is in turn dependant on the linear position of the piston of the hydraulic cylinder 350 which is housed inside the tower. In the preferred embodiment, for reasons of serviceability, a plurality of hydraulic cylinders 350 is used. The cylinders are mounted in a housing outside the tower to facilitate easy replacement. Referring to FIGS. 7 and 9A-9E, the straight blades 109 are mounted on cylindrical rotor 300 of the vertical axis wind turbine through revolute joints 111 at the ends of the radial arms.

The slider 100 has prismatic joints with the rotor. Connecting rods, with two spherical joints each connect the slider and the blades which both have sphere ended spherical ended stub shaft extensions while the outer race of slew ring bearing has a planar joint 107 (refer to FIG. 7) with the slider.

The lower slew ring bearing 104 connects the slider to the pitch actuation system. The hydraulic cylinders provide linear motion are each connected via stub shafts 355 to the bottom portion of the inner race of the slew ring bearing 104. The inner race of the bearing can only move linearly up and down while the outer race is connected via suitable mean to the slider 300 which moves around the tower at the angular speed of the vertical rotor and can also simultaneously move linearly up and down. The cylinders are supported by the housing 310.

There is no contact between the tower and the slew ring bearing. The inner race of the bearing is free to elevate or descend depending on the position of the elevation produced by the stub shafts. The outer race is engaged with the slider which consequently elevates or descends and also rotates about the tower as it is integral to the VAWT shell and blade system. The hydraulic system (not shown) consisting of hydraulic connections, fluid storage, pump and other hydraulic circuit elements is housed inside the HAWT's tower.

Basic Operational Sequence and Prediction of Additional Power Derived

Figure 11:
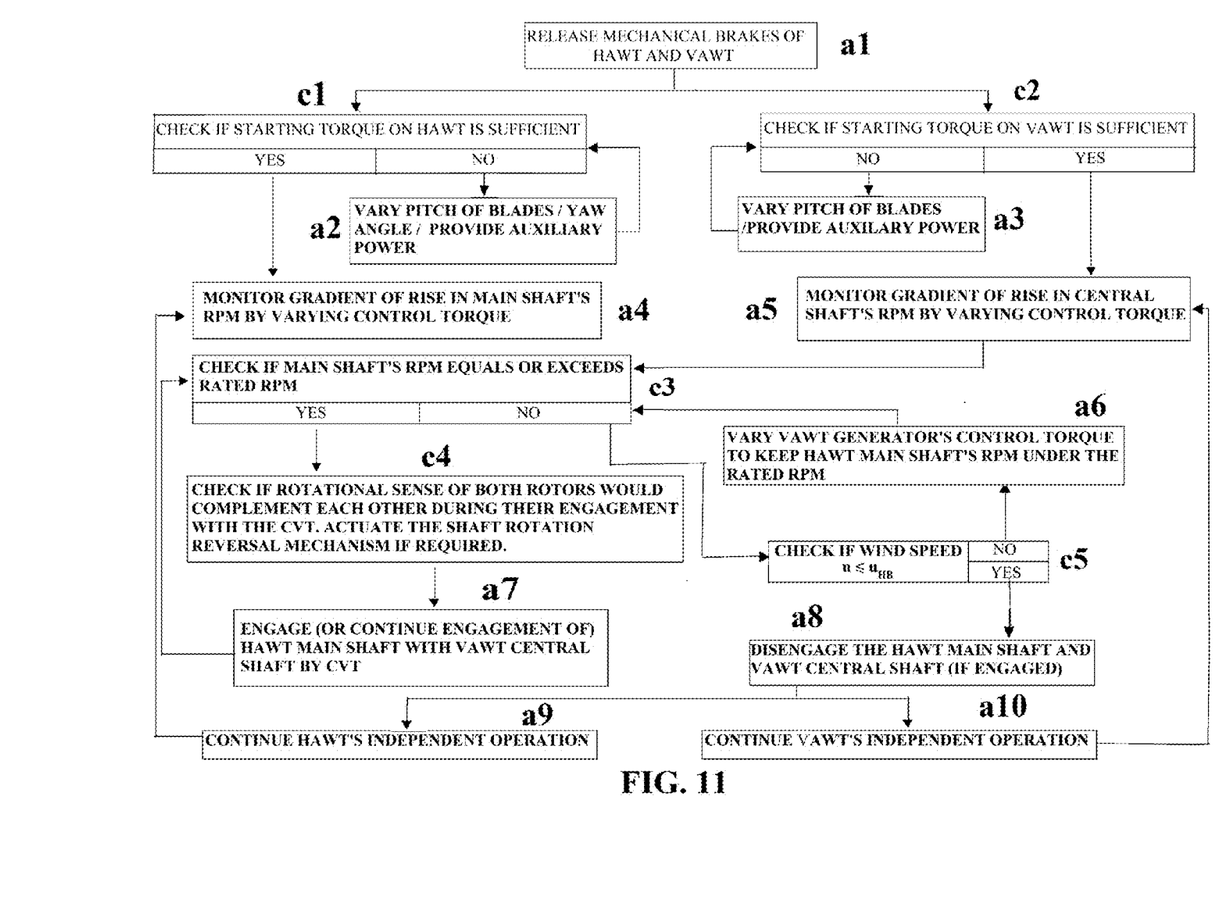
FIG. 11 is flow chart illustrating operational sequence for integrating the HAWT 1 and VAWT 2, in accordance with an embodiment.

A simplified operational sequence of the integration of the two rotors is shown in FIG. 11. Operations are given nomenclature a1 to a10. Conditions for control algorithm are given the nomenclature c1 to c5. After the brakes are released (a1), the controller receives various input data (wind speed, torque on both shafts etc). The starting torque on both the VAWT central shaft and HAWT main shaft are checked (c1 and c2) and pitch mechanisms of both sets of blades are actuated if required (a2 and a3). The gradients of rise in rpm of the HAWT main shaft and VAWT central shaft are calculated and monitored (a4 and a5).

Under conditions that necessitate the speed control at the optimal rpm of synchronous electrical generation (c3), the two rotors are engaged with the CVT (a7) and the shaft rotation reversal mechanism is actuated, if required (c4). Under the condition that the rpm of the HAWT's shaft equals the rpm corresponding to that of rated power output at optimal Tip Speed Ratio and the rpm is at the limit equal to the rpm corresponding to rated wind speed of stand-alone HAWT (c5), the controller varies the CVT's ratio and VAWT generator's control torque (a6) with the objective of maintaining constant the rpm of both rotors at values equal to those at the instant of their integration. However, if the HAWT main shaft's rpm does not approach the maximum permissible rpm, disengagement of the two rotors ensues (a8) and normal independent electrical generation of the two turbines continues (a9 and a10).

The power afforded by the wind at higher altitudes is higher than at lower altitudes. Also the HAWT 1 has higher angular momentum than the VAWT 2 (owing to its higher moment of inertia). Therefore, the HAWT's rotary motion acts as a source of energy and the VAWT's rotor acts as a sink when they are coupled.

The controller monitors the rpm of the two rotors and by suitable actuation may vary the lift forces on either turbine's blades by the pitch mechanism of either turbine to effectively keep the HAWT's main shaft under the rated rpm. When there is no need to keep them integrated, the disengagement of the main HAWT shaft and the VAWT central shaft is actuated.

As the power supplied or extracted is a product of torque and angular speed of the main shaft, $\Delta P_{HAWT}$ at a constant rpm $\omega_H$ and wind speeds exceeding the rated wind speed is proportional to the change in only torque $\Delta \tau_H$.

To ensure that the HAWT main shaft is running at constant rpm at wind speeds above its normal rated wind speed, excess control torque must be exerted on the VAWT generator. This is in excess of torque $\tau_{cV}$ exerted during the VAWT's independent operation, and is required to keep the central shaft rotating at a constant rpm $\omega_{VH}$. The increased mechanical power derived by integration is therefore, equal to $\Delta \tau_{cVH} \cdot \omega_{VH}$ more than that obtained by its independent operation.

Both generators 102 and 225 may be integrated with multi-stage planetary gearboxes. Hydraulic connections, electrical transmission, power electronics and yaw motor assemblies are integral to both turbine assemblies. Both generators 102 and 22 may be integrated with multi-stage planetary gearboxes. Other support fixtures, fluid couplings and support bearings (not shown in figures) are installed to mitigate problems caused by the fatigue loading and vibrations in the tower.

Other support structures include vertical angular contact bearings 402 and collars 401, stationary tower 300, cylinder head 105 and slew ring bearing 112. The generator 102 produces varying power output. For a large scale application, variable field excitation by an appropriate control system may be used.

The processes described above is described as sequence of steps, this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A wind turbine comprising:
   an elevated nacelle comprising:
   a main shaft, horizontally aligned to the elevated nacelle, coupled with a set of blades, wherein the set of blades rotate about a longitudinal axis of the elevated nacelle;
   a set of horizontal shafts associated with the main shaft at different elevations inside the elevated nacelle; and
   a mechanism to rotate the set of horizontal shafts along with the main shaft when the set of blades are subject to force of wind;
   a hollow cylindrical shell coupled to a set of parallel blades by means of radial arms, wherein the set of parallel blades rotate about a vertical axis of the elevated nacelle when exposed to wind; and
   a support tower configured to connect the elevated nacelle and the hollow cylindrical shell.

2. The wind turbine according to claim 1, further comprising:
   a central vertical shaft partially enclosed within the support tower and passing along a length direction of the support tower, wherein the central vertical shaft transmits excess torque from the set of horizontal shafts to a generator positioned below the set of parallel blades; and
   power transmitting elements associated with the central vertical shaft and the set of horizontal shafts such that the power transmitting elements are suitably engaged to transmit the excess torque to the generator through the central vertical shaft.

3. The wind turbine according to claim 2,
   wherein one of the set of horizontal shafts and the central vertical shaft are operably coupled through a main right angled transmission system, and
   wherein the right angled transmission system comprises a pair of bevel gears whose axes of rotation are right angle aligned to each other, such that one of the pair of bevel gears can roll over the other of the pair of bevel gears while simultaneously transferring rotary motion from the one of the set of horizontal shafts inside the elevated nacelle to the central vertical shaft.

4. The wind turbine according to claim 2, wherein the elevated nacelle further comprises:
   a shaft rotation reversal mechanism configured to match the direction of rotation of one of the set of horizontal shafts with the direction of rotation of other of the set of horizontal shafts, wherein the direction of rotation of the set of horizontal shafts is determined based on the direction of rotation of the central vertical shaft.

5. The wind turbine according to claim 2, wherein the power transmitting elements includes a continuously variable transmission (CVT) system.

6. The wind turbine according to claim 5, wherein each of the set of horizontal shafts comprises an engagement assembly, wherein the engagement assembly is operable to engage the horizontal shafts to which it is engaged to, with the other of the set of horizontal shafts using CVT, and
   wherein the engagement assembly comprises a telescopic retractable shaft arrangement which extend and contract based on the operation of a linear actuator whose line of action is in a direction of movement parallel to the axis of the horizontal shafts to which it is engaged.

7. The wind turbine according to claim 5, wherein the engagement assembly comprises a toothed wheel configured to engage with cavities defined in the sprocket, wherein the sprocket is integral to the CVT system.

* * * * *